United States Patent
Noyola et al.

[19]

[11] Patent Number: 6,089,508
[45] Date of Patent: Jul. 18, 2000

[54] AUTONOMOUS SPACECRAFT SAFING WITH REACTION WHEELS

[75] Inventors: Richard A. Noyola, Torrance; Che-Hang C. Ih, Rancho Palos Verdes, both of Calif.

[73] Assignee: Hughes Electronics Corporation, El Segundo, Calif.

[21] Appl. No.: 09/033,561

[22] Filed: Mar. 2, 1998

[51] Int. Cl.$^7$ ............................................ B64G 1/28
[52] U.S. Cl. ........................................ 244/165; 244/164
[58] Field of Search ............................... 244/158 R, 164, 244/165, 171; 701/4, 13

[56] References Cited

U.S. PATENT DOCUMENTS

| | | | |
|---|---|---|---|
| 4,010,921 | 8/1975 | Pistiner et al. | 244/165 |
| 4,188,666 | 2/1980 | Legrand et al. | 244/164 |
| 5,035,381 | 7/1991 | Matthews | 244/164 |
| 5,257,759 | 11/1993 | Bender | 244/171 |
| 5,279,483 | 12/1991 | Blancke et al. | 244/165 |
| 5,433,402 | 7/1995 | Surauer et al. | 244/164 |
| 5,692,707 | 5/1995 | Smay | 244/165 |
| 5,931,421 | 8/1996 | Surauer et al. | 244/165 |

*Primary Examiner*—Peter M. Poon
*Assistant Examiner*—Charles P. Ducker, Jr.
*Attorney, Agent, or Firm*—T. Gudmestad; M. W. Sales

[57] ABSTRACT

A spacecraft with a reaction wheel system can be autonomously safed by setting the solar wings to continuous tracking, determining a slew rate vector based on the total angular momentum, and slewing the spacecraft using the slew rate vector until commanded to stop autonomous safing. In a typical application, the spacecraft has a reaction wheel assembly with four wheels arranged to form a right regular pyramid. Two reaction wheels on opposite edges of the pyramid form a first pair and the two remaining reaction wheels forming a second pair. The slew axis of rotation is found by determining as a selected pair the first pair if either reaction wheel in the second pair is inoperative, otherwise determining as the selected pair the second pair and determining as the slew axis of rotation the normalized projection of the axes of rotation of the selected pair onto the base. The slew direction is determined by the sign of the total angular momentum component along the slew axis of rotation.

10 Claims, 8 Drawing Sheets

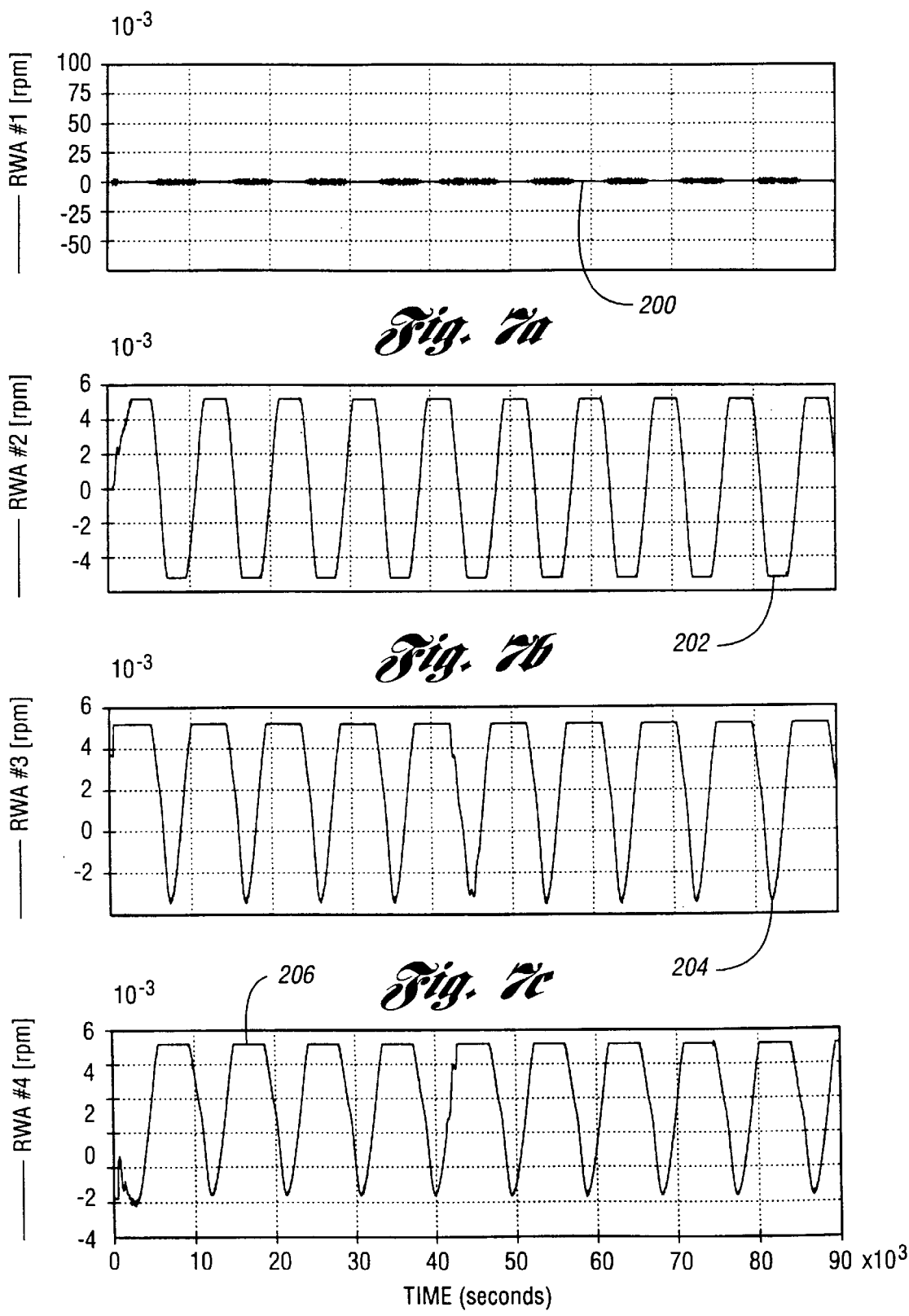

AUTONOMOUS SPACECRAFT SAFING WITH REACTION WHEELS

TECHNICAL FIELD

The present invention relates to performing autonomous sun acquisition by a spacecraft under reaction wheel control.

BACKGROUND ART

Throughout the life of a spacecraft, attitude modifications are made to carry out mission objectives, to determine orientation, and to correct for undesired torques. In order to minimize expendable fuel in slewing maneuvers, reaction wheel systems are used to transfer rotational momentum to and from the satellite body.

In performing attitude modification slews, conditions may arise that prevent the maneuver from being successful. One such condition is when the total system momentum exceeds the storage capability of the reaction wheel assembly. What is needed is a method and system of controlling the spacecraft in the presence of momentum saturation. Spacecraft health must be ensured by providing a safe power situation and to allow periodic telemetry and command (T&C) visibility to the ground. The spacecraft should be controllable even if the reaction wheel assembly is partially inoperative.

SUMMARY OF THE INVENTION

As such, one object of the present invention is to control the spacecraft in the presence of momentum saturation.

Another object of the present invention is to autonomously control the spacecraft in situations where contact with a ground station has been temporarily lost.

Yet another object of the present invention is to autonomously control the spacecraft under the condition that at least one reaction wheel is inoperative.

A further object of the present invention is to ensure a safe power mode.

A still further object of the present invention is to ensure periodic T&C visibility to the ground.

In carrying out the above objects and other objects and features of the present invention, a method is provided for autonomous safing of a spacecraft with reaction wheels, the spacecraft having at least one wing for generating power, including setting the wing to continuous tracking, determining a slew rate vector based on the total angular momentum, and slewing the spacecraft using the slew rate vector until commanded to stop autonomous safing.

In one embodiment of the present invention, the spacecraft has four reaction wheels with the reaction wheel axes forming the slant edges of a pyramid having a square base. Two reaction wheels across from each other form a first pair and the remaining two reaction wheels form a second pair. Determining a slew rate vector includes determining as a selected pair the first pair if either reaction wheel in the second pair is inoperative, otherwise determining as the selected pair the second pair. The slew axis of rotation is determined as the projection of the axes of rotation of the selected pair onto the base.

In another embodiment of the present invention the spacecraft has a preset fault hold rate. Determining a slew rate vector further includes computing the product of the preset fault hold rate, the normalized projection of the axes of rotation of the selected pair, and the slew direction determined by the sign of the total angular momentum component along the slew axis of rotation.

A system is also provided in accordance with the present invention for autonomous safing of a spacecraft with reaction wheels. The system includes at least one solar wing, a solar wing drive for each solar wing attaching the solar wing to the body, the solar wing drive operable to rotate the solar wing relative to the body, a reaction wheel system to exchange rotational momentum with the body, and a control logic in communication with each solar wing drive and the reaction wheel system.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIGS. 7a through 7d are plots of simulated wheel speeds for an illustrative example of the present invention.

BEST MODE FOR CARRYING OUT THE INVENTION

Figure 1:
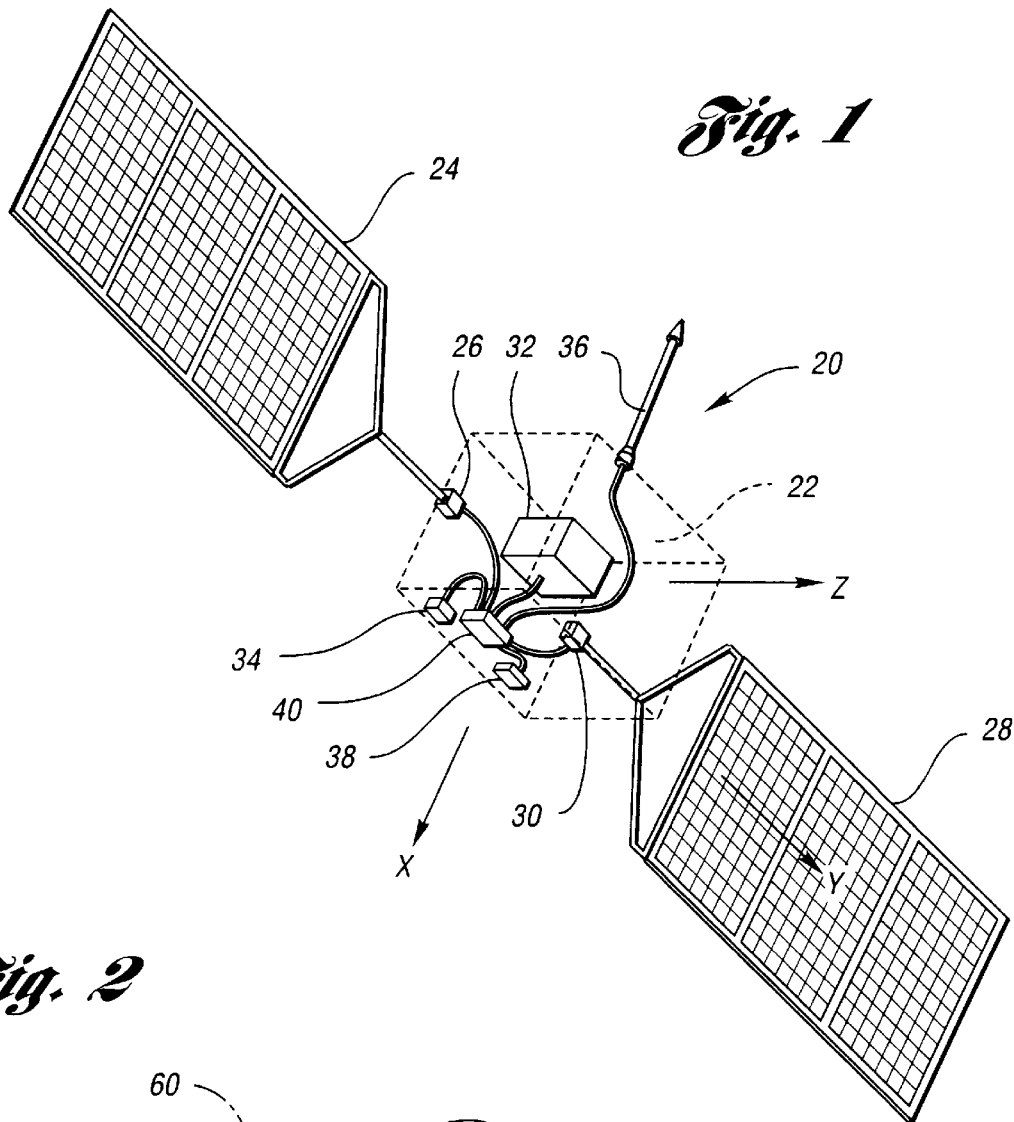
FIG. 1 is a graphical representation of a spacecraft that may use the method of the present invention.

Referring now to FIG. 1, a graphical representation of a spacecraft for using the present invention is shown. A spacecraft, shown generally as 20, has body 22. An orthonormal body frame is indicated by the X or roll axis, Y or pitch axis, and Z or yaw axis.

North solar wing 24 is rotatively attached to the north or −Y face of body 22 through north solar wing drive 26. North solar wing drive 26 is operative to rotate north solar wing 24 relative to body 22. South solar wing 28 is rotatively attached to the south or +Y face of body 22 through south solar wing drive 30. South solar wing drive 30 is operative to rotate south solar wing 28 relative to body 22. Solar cells, not shown for clarity, may be attached to north solar wing 24 or south solar wing 28.

Spacecraft 20 includes reaction wheel system 32 to exchange rotational momentum between the wheels and body 22 so as to modify the attitude of spacecraft 20. A typical reaction wheel system is described with regards to FIG. 2 below. Spacecraft 20 may also include thrusters, not shown for clarity, to drive attitude and position changes.

In one embodiment, sun sensor 34 is attached to spacecraft body 22 and operates to determine the position of the sun relative to body 22. Sun sensor 34 may be a wide field of view sun sensor assembly (SSA). In another embodiment, sun position is obtained by slewing solar wings 24 and 28 until a maximum current is obtained from the solar cells. The position of wings 24 and 28 relative to body 22 indicate a projection of the sun vector onto the roll-yaw plane. For an exemplary spacecraft used in the simulations described with regards to FIGS. 6 through 8 below, sun sensor 34 has a boresight in the roll-yaw plane, located 40 degrees from the +X axis towards the +Z axis.

Spacecraft 20 may also include antenna 36 for T&C communication with a ground station not shown. A set of three-axis gyroscopes 38 senses changes in attitude. Control logic 40, in communication with north solar wing drive 26, south solar wing drive 30, reaction wheel system 32, sun sensor 34, antenna 36, and gyroscopes 38, accepts input from sensors and produces signals to actuators so as to accomplish the present invention.

Figure 2:
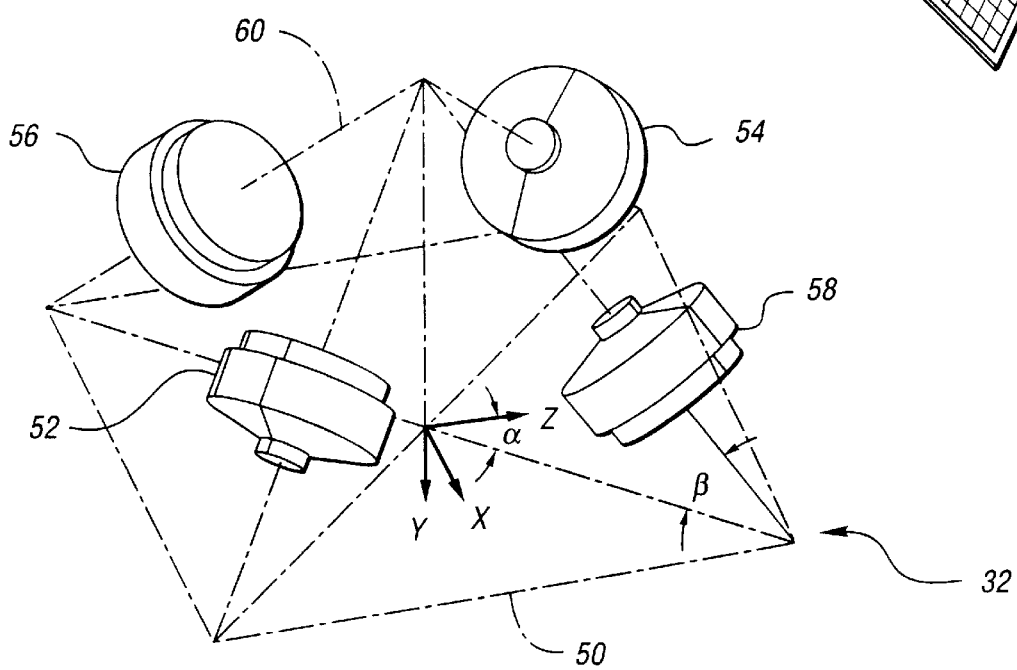
FIG. 2 is a graphical representation of reaction wheel assembly pyramid that may be used by the method of the present invention.

Referring now to FIG. 2, a graphical representation of reaction wheel assembly pyramid that may be used by the method according to the present invention is shown. Reaction wheel system 32 includes reaction wheel assembly 50.

In a preferred embodiment, reaction wheel assembly 50 includes reaction wheel one (RW1) 52, reaction wheel two (RW2) 54, reaction wheel three (RW3) 56, and reaction wheel four (RW4) 58. The reaction wheels are arranged such that the axes of rotation form the slant edges of a right regular pyramid 60. That is, the base of pyramid 60 formed by the axes of rotation is a square. Typically, pyramid 60 would be oriented such that the base is normal to solar wing 24,28 axis of rotation. For spacecraft 20 shown in FIG. 1, the base of pyramid 60 lies in the X–Z plane. Note that the projection of the axes of rotation for wheels on opposite side of pyramid 60 onto the base are collinear. The base is rotated an angle α, typically 45 degrees, from the Z axis. The altitude, or height, of pyramid 60 is parallel to the Y axis. The angle of elevation, β, determines the height of pyramid 60. In an illustrative example, β is 45 degrees.

Each wheel in reaction wheel assembly 50 may be spun in either direction, independently of other wheels, up to a maximum velocity. The maximum velocity determines the saturation momentum for the wheel. The vector sum of momenta stored in all wheels represents the total momentum stored in reaction wheel assembly 50.

Figure 3:
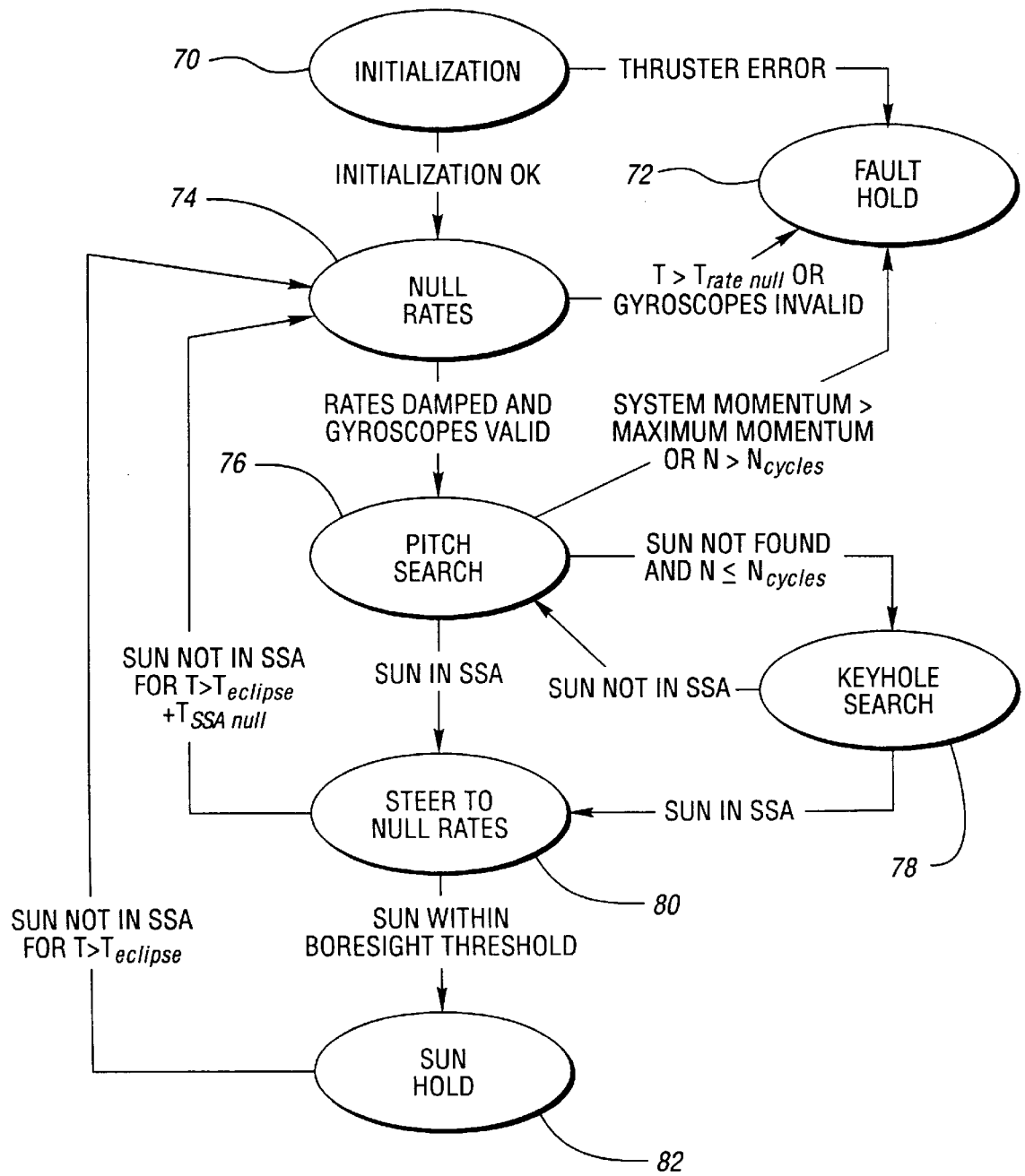
FIG. 3 is a state diagram showing a common sun acquisition sequence that may initiate the method of the present invention.

Referring now to FIG. 3, a state diagram showing a common sun acquisition sequence that may initiate the method of the present invention is shown. Spacecraft 20 may be commanded to acquire a sun-pointing attitude. Initialization state 70 is used to set steering to inertial and initialize the sequence. During initialization faults may occur such as, for example, receiving sensor indications that a thruster valve is closed after a command to enable thrusters. In this case, fault hold state 72 is entered. If initialization is successful, null rates state 74 is entered.

Null rates state 74 is used to null residual rates, initiate solar wing 24,28 sun search, and monitor the validity of gyroscopes 38. If a time greater than the null rate time $T_{rate\_null}$ is required or if gyroscopes 38 produce invalid readings, fault hold state 72 is entered. If rates are damped within $T_{rate\_null}$ and gyroscopes 38 are operating properly, a pitch search is initiated.

Pitch search state 76 is used to slew spacecraft 20 about the pitch axis. If the sun is not found by sun sensor 34, the sun is assumed to be roughly aligned with the Y axis, in which case a keyhole search is performed. If the sun is located by sun sensor 34, the position of the sun has been determined and spacecraft 20 is steered to center the sun in the SSA. If the momentum of spacecraft 20 exceeds the maximum momentum allowed by reaction wheel system 32, fault hold state 72 is entered. Fault state 72 is also entered if the number of cycles N between pitch search and keyhole search exceeds a constant $N_{cycles}$.

Keyhole search state 78 is used to perform a keyhole search. Spacecraft 20 is rotated about an axis perpendicular to the pitch axis through an angle of approximately 90 degrees to move the sun off the pitch axis. If the sun appears in sun sensor 34 while performing the keyhole search, the spacecraft is steered to center the sun in sun sensor 34. If not, a pitch search is performed.

Steer to null SSA state 80 is used to slew spacecraft 20 in order to bring the sun within the boresight of sun sensor 34 and rates are nulled. If successful, sun hold state 82 is entered. If acquisition is not accomplished within a set time period, null rates state 74 is entered. The time allowed is the sum of the eclipse time, $T_{eclipse}$, which allows for time during which the sun is blocked by a celestial body such as the earth, and the time required to perform the steer to null SSA slew, $T_{SSA\_null}$.

Sun hold state 82 holds the sun in sun sensor 34. If the sun is not in view for a length of time greater than $T_{eclipse}$, null rates 74 state is entered.

Fault hold state 72 is entered if a fault condition occurs during sun acquisition. While in fault hold, spacecraft 20 must maintain power safe and T&C coverage while waiting for ground commands. The present invention provides a method and system for choosing the slew axis and direction for a continuously commanded rate so that maximum momentum in reaction wheel system 32 can be applied. Spacecraft 20 is rotated regardless of the relative solar position in order to maintain T&C coverage and to get power from solar wings 24,28. Since solar wings 24,28 are along the body pitch axis, spacecraft 20 is rotated about an axis transverse to the y axis so that currents can be generated on solar wings 24,28 periodically even if the sun is initially along the y axis. Even with periodic saturation of reaction wheel system 32 keeping spacecraft 20 from achieving the desired rate, periodic solar power from wings 24,28 is assured.

Figure 4:
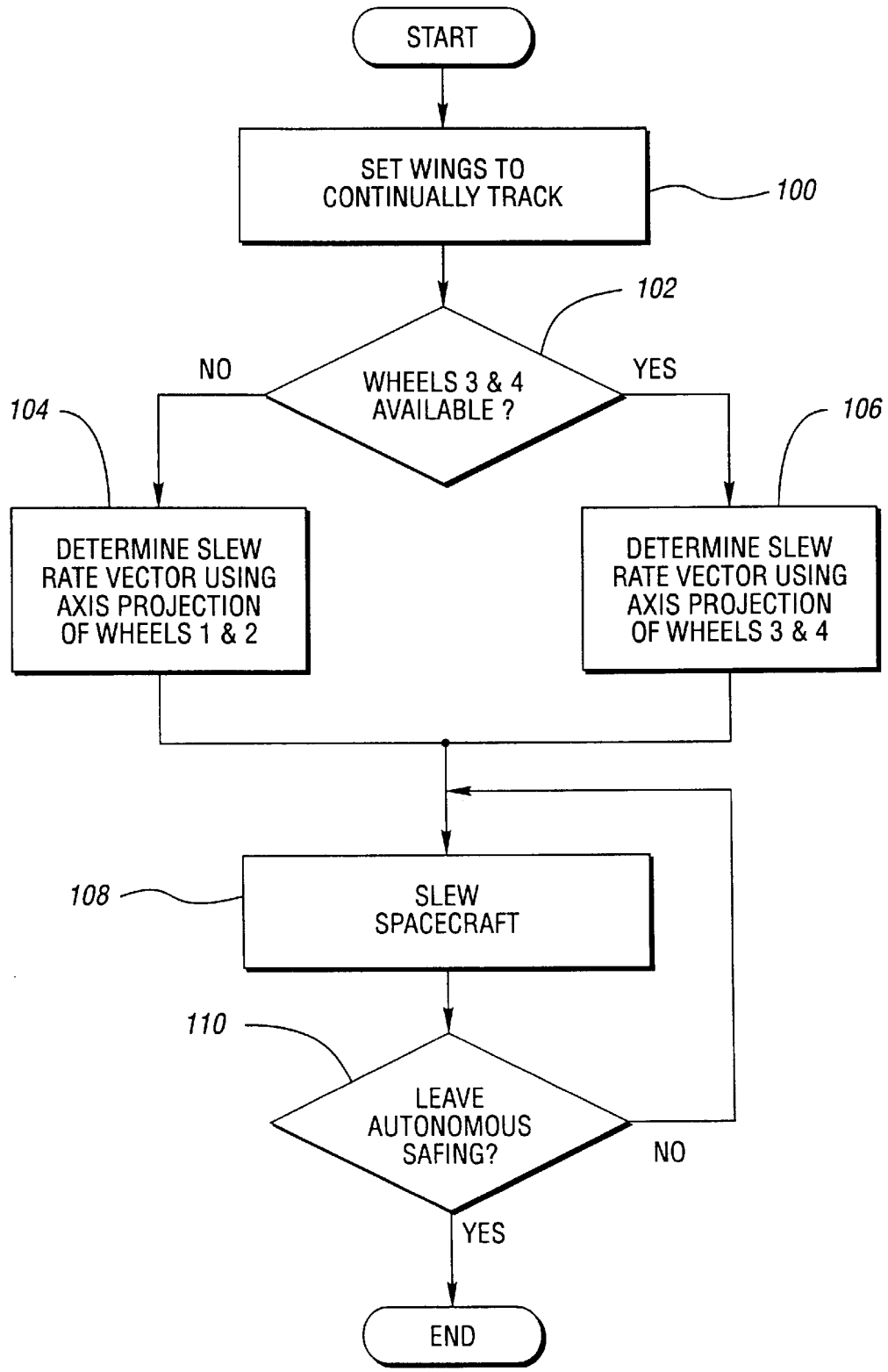
FIG. 4 is a flow diagram representing operation of a system or method according to the present invention.

Referring now to FIG. 4, a flow diagram representing operation of a system or method according to the present invention is shown. As will be appreciated by one of ordinary skill in the art, the operations illustrated are not necessarily sequential operations. Similarly, operations may be performed by software, hardware, or a combination of both. The present invention transcends any particular implementation and is shown in a sequential flow chart form for ease of illustration.

Wings are set to continuously track the sun in block 100. The solar wing drive mode is set to continuously search for and track the sun by using solar array angle feedback derived from measurements from a solar array current sensor on north solar wing 24 or south solar wing 28.

The present invention is capable of controlling spacecraft 20 even if one wheel in reaction wheel assembly 50 fails. The decision represented by block 102 determines whether RW1 52 and RW2 54 or whether RW3 56 and RW4 58 will be used to determine the slew rate vector. If all wheels are operative, the default is to use RW3 56 and RW4 58.

The slew rate is determined using the normalized projected axes of wheels one and two in block 104. A slew rate vector, $\vec{\omega}$, is calculated as $$\vec{\omega} = \text{sgn}(^{b}H_{tot}^{T} \cdot U_{fault\_hold12}) \omega_{fault\_hold} U_{fault\_hold12} \quad (1)$$

where· is the dot product; $^b H^T_{tot}$ is the total angular momentum in the body frame including momentum in body 22, reaction wheel system 32, and solar wings 24,28; $\omega_{fault\_hold}$ is the preset fault hold rate; and $U_{fault\_hold12}$ is the normalized slew axis along the projection of spin axis of RW1 52 and RW2 54 on the X–Z plane, or, for reaction wheel assembly 50 described with regards to FIG. 2 above, $$u_{fault\_hold12} = \left[ \frac{1}{\sqrt{2}} 0 - \frac{1}{\sqrt{2}} \right]^T \quad (2)$$

The slew rate is determined using the projected axes of wheels three and four in block 106. The slew rate vector, $\vec{\omega}$, is calculated as $$\vec{\omega} = \text{sgn}(^b H_{tot}^T \cdot U_{fault\_hold34}) \omega_{fault\_hold} U_{fault\_hold34} \quad (3)$$

where $U_{fault\_hold34}$ is the slew axis along the projection of spin axis of RW3 56 and RW4 58 on the X–Z plane, or, for reaction wheel assembly 50 described with regards to FIG. 2 above, $$u_{fault\_hold34} = \left[ \frac{1}{\sqrt{2}} 0 \frac{1}{\sqrt{2}} \right]^T \quad (4)$$

The physical meaning of Equations (1) through (4) will now be explained. Slewing about the projection of the wheel spin axes will give maximum momentum. Which set of axes are used depends on the availability of the wheels. If a wheel in one pair of opposing wheels fails, the projected axes of the other pair is used. For example if RW3 56 fails, then the slew axis will be $U_{fault\_hold12}$. If all wheels are available, $U_{fault\_hold34}$ is chosen as the default slew axis. The preset fault hold rate, $\omega_{fault\_hold}$, can be set to a low value as long as periodic T&C and wing current can be maintained. The slew direction, determined by the sgn( ) operation, indicates that, if the momentum leans toward one direction, then the body is slewed about that direction. This results in wheel momenta commanded towards the opposite direction, providing the maximum momentum capacity for the slew.

The calculation of slew rate vector $\vec{\omega}$ expressed in blocks 102, 104 and 106 is for the illustrative reaction wheel assembly 50 described with regards to FIG. 2 above. Other methods for calculating slew rate vector $\vec{\omega}$ are possible.

Referring again to FIG. 4, the spacecraft is slewed 108. Once a slew rate vector is calculated, spacecraft 20 is commanded to change attitude using the slew rate vector.

A check is made for leaving autonomous safing 110. Spacecraft 20 may continue autonomous safing until commanded to stop. If autonomous safing is to continue, spacecraft 20 is continuously slewed using the slew rate vector.

Figure 5:
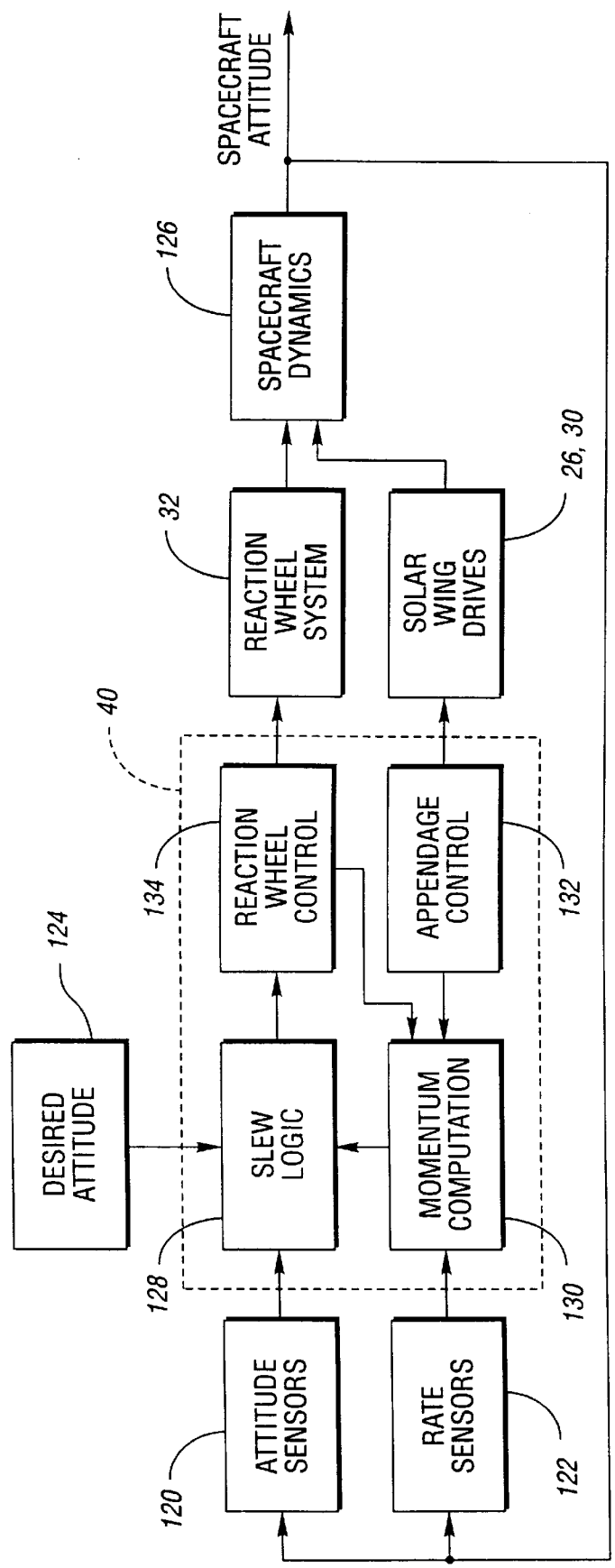
FIG. 5 is a block diagram of a control arrangement for effecting a spacecraft maneuver in accordance with the present invention.

Referring now to FIG. 5, a block diagram of a control arrangement for effecting a spacecraft maneuver in accordance with the present invention is shown.

Control logic 40 accepts attitude measurements from attitude sensors, shown generally as block 120, rotational rate measurements from rate sensors, shown generally as block 122, and desired attitude signals, shown as block 124. The desired attitude signals may be commanded from a ground station not shown or may be produced from an on-board algorithm. Control logic 40 develops wheel torque commands for reaction wheel system 32. These commands create wheel torques that modify the attitude of spacecraft 20 through spacecraft dynamics, shown generally by block 126. Control logic 40 also develops wing torque commands for solar wing drives 26,30. These commands rotate solar wings 24,28 relative to spacecraft body 22.

Within control logic 40, slew logic 128 accepts measured attitudes from attitude sensors 120, desired attitudes 124, and spacecraft total momentum from momentum computation 130, and determines a slew rate and direction as described with regards to FIG. 4 above. Momentum computation 130 uses spacecraft rate measurements from rate sensors 122, appendage rates from appendage control 132, and wheel rates from reaction wheel control 134 to determine the total angular momentum. Reaction wheel control 134 uses slew rate and direction from slew logic 128 to determine wheel torque commands.

SIMULATION RESULTS

The performance of the present invention was validated through ADSIM simulation for a typical spacecraft. Spacecraft 20 is modeled as a five-panel rigid body having a configuration as described with regards to FIG. 1 above. Reaction wheel system 32 has reaction wheel assembly 50 as described with regards to FIG. 2 above with base rotation angle α of 45 degrees, angle of elevation β of 45 degrees, with RW1 52 failed, and with RW2 54, RW3 56 and RW4 58 having momentum saturation occurring at a wheel speed of 5,200 revolutions per minute (RPM). The maximum momentum threshold with RW1 52 failed is approximately 14 Newton-meter-seconds (Nms).

The simulation shows approximately 25 hours of time. Initially, the sun is along the body pitch axis and spacecraft 20 has a momentum vector with a magnitude of 40 Nms and a +Y direction. These initial conditions represent a particularly difficult situation.

Figure 6A:
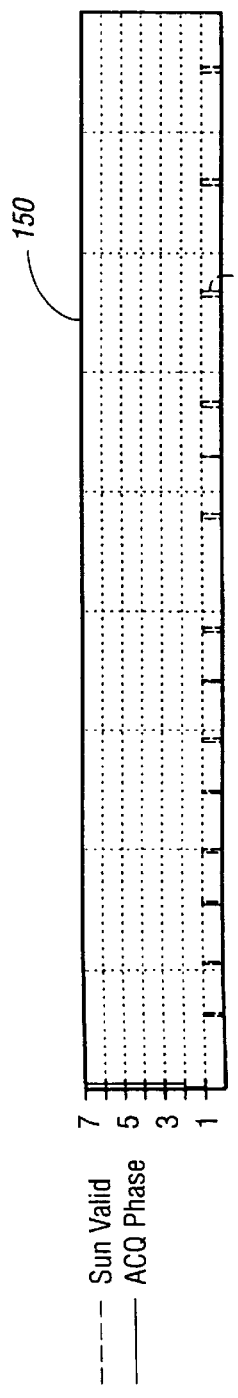
FIGS. 6a through 6h are plots of simulated satellite parameters for an illustrative example of the present invention.

Referring now to FIGS. 6a through 6h, various simulated satellite parameters are shown. FIG. 6a includes a trace indicating simulated acquisition states 150, where 1 is initialization state 70, 2 is null rates state 74, 3 is pitch search state 76, 4 is keyhole search state 78, 5 is steer to null SSA state 80, 6 is sun hold state 82, and 7 is fault hold state 72. At approximately 200 seconds into the simulation, sun acquisition begins. Shortly after, null rates state 74 is entered. Since the initial system momentum of 40 Nms is greater than the maximum momentum threshold of 14 Nms, acquisition transitions into fault hold state 72 and autonomous safing begins.

Figure 6B:
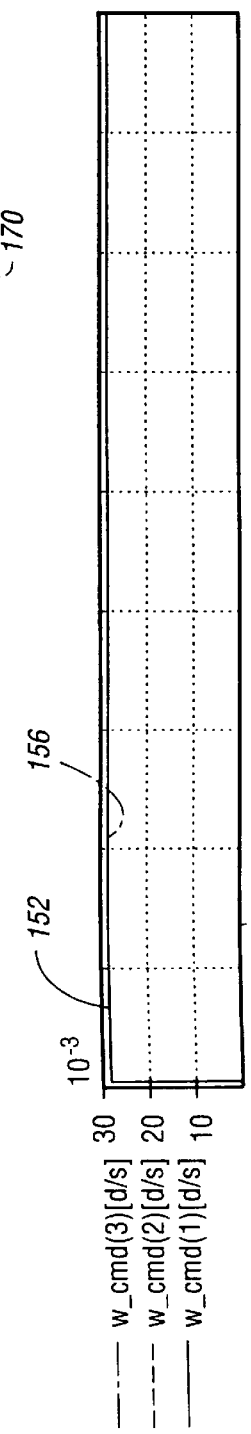

Referring now to FIG. 6b, commanded body slew rates are shown as commanded roll rate 152, commanded pitch rate 154, and commanded yaw rate 156. Upon entering fault hold state 72, a fault hold rate $\omega_{fault\_hold}$ of 0.04 degrees per second (°/s) is commanded. Since RW1 52 has failed, the slew axis is chosen to be along the projection of the spin axes of RW3 56 and RW4 58 into the X–Z plane and, hence, the commanded rate is decomposed into 0.0283°/s about the positive roll axis and 0.0283°/s about the positive pitch axis.

Figure 6C:
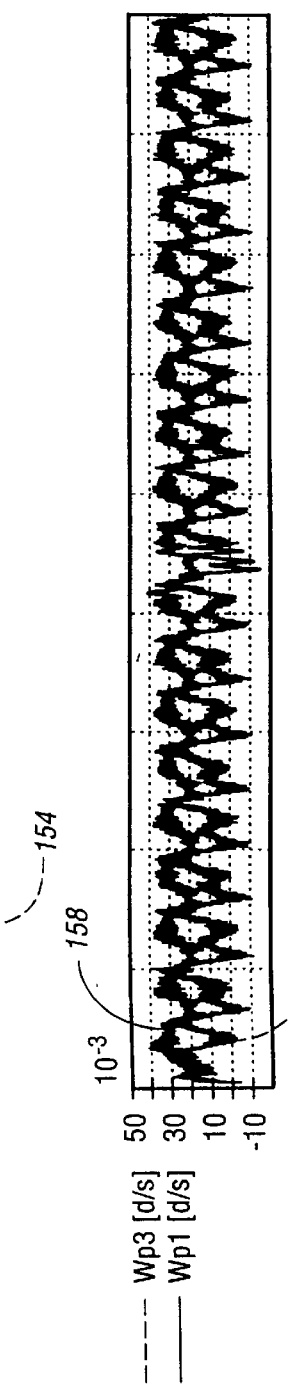
Figure 6D:
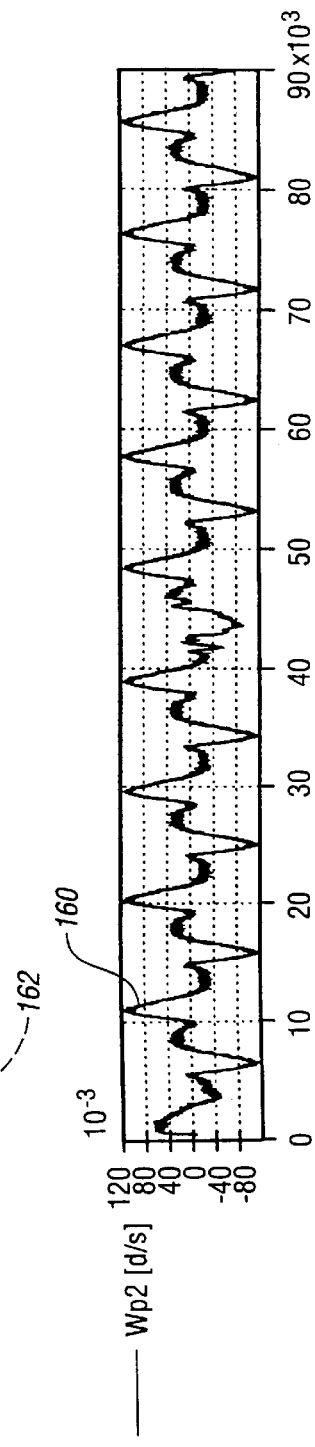

Referring now to FIGS. 6c and 6d, true body rates about the roll axis 158, pitch axis 160, and yaw axis 162 are shown.

Figure 6E:
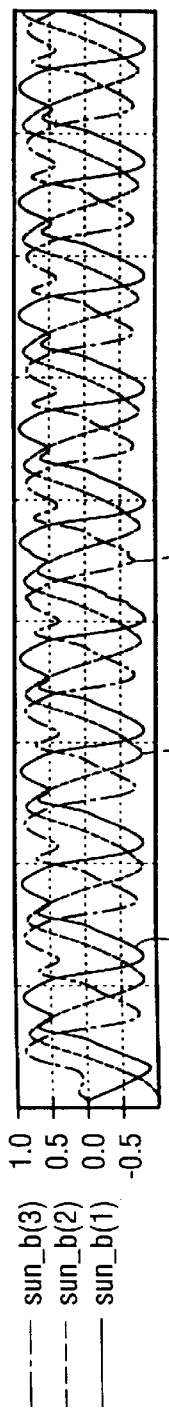

Referring now to FIG. 6e, the sun vector in the body frame is shown. Sun vector X-component 164, sun vector Y-component 166, and sun vector Z-component 168 indicate the position of the sun relative to spacecraft body 22.

Referring again to FIG. 6a, sun valid signal 170 is shown. Sun valid signal 170 equals 1 when the sun falls within the field of view of sun sensor 34 and is 0 otherwise.

Figure 6F:

Referring now to FIG. 6f, solar wing currents in amperes are shown. North solar wing current 172 and south solar wing current 174 indicate that spacecraft 20 is kept in a safe power mode throughout most of the 25 hour simulation. The drop in current from about 4,100 seconds through about 4,500 seconds represents a simulated eclipse of the sun by the earth. Note that, since north solar wing 24 and south solar wing 28 are both rotated to maximize wing current, currents 172 and 174 are almost identical in this example.

Figure 6G:
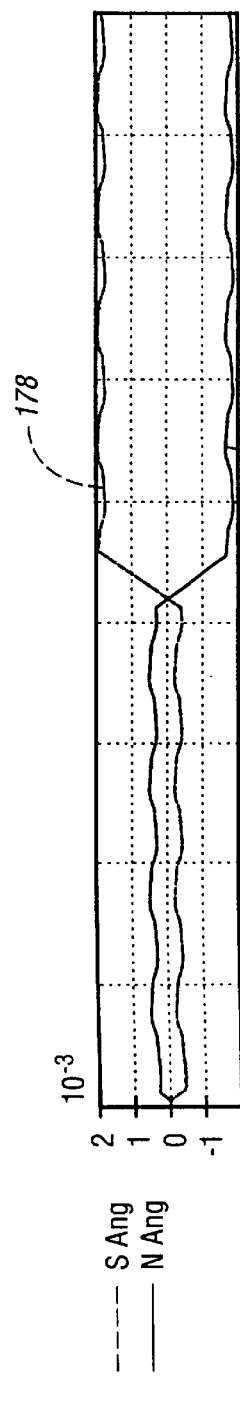

Referring now to FIG. 6*g*, solar wing angles in degrees are shown. North solar wing angle 176 and south solar wing angle 178 make small angular corrections to maximize wing current except during the simulated eclipse when the wings are in solar search mode.

Figure 6H:
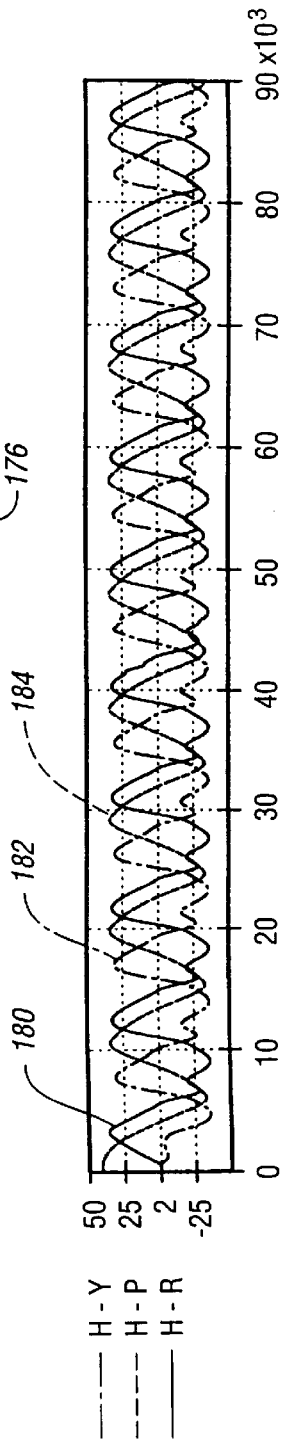
Figure 8A:
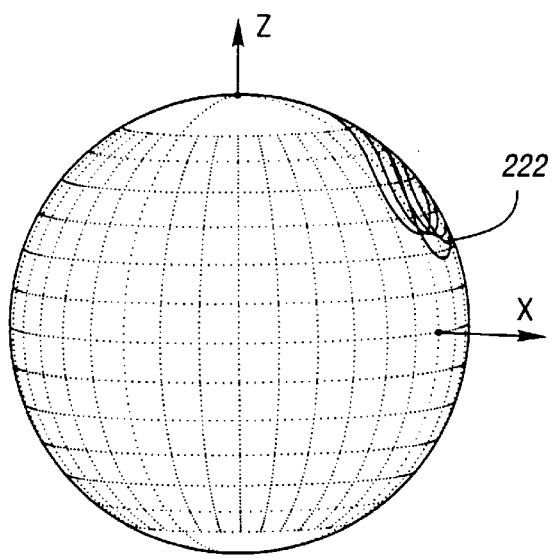
FIGS. 8a through 8d are polar plots of a simulated body pitch axis trace in the earth-centered inertial (ECI) frame for an illustrative example of the present invention.
Figure 8B:
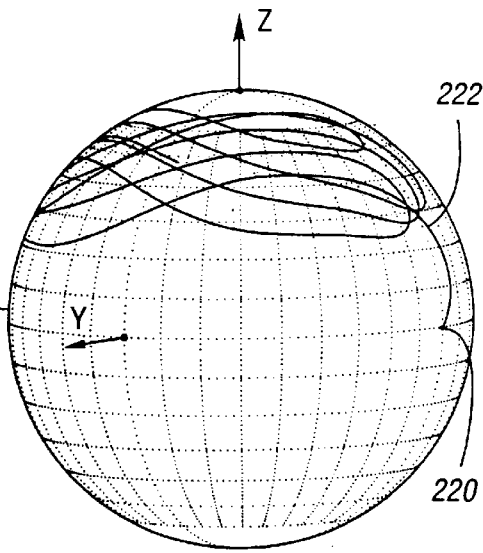
Figure 8C:
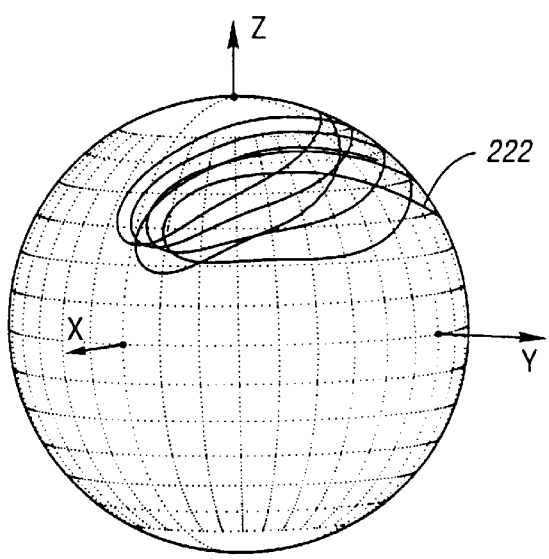
Figure 8D:
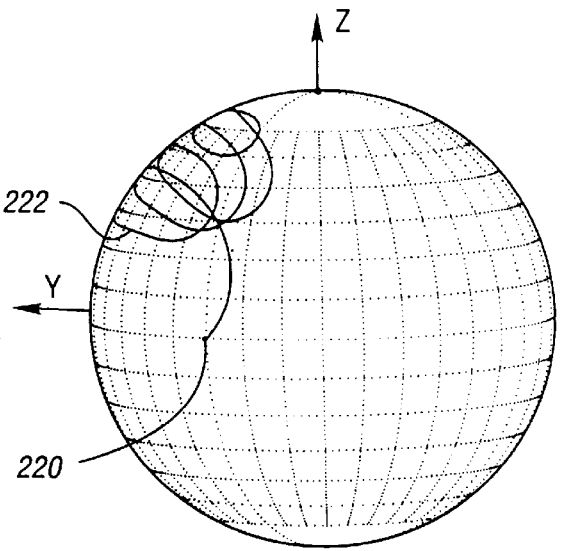

Referring now to FIG. 6*h*, true system momentum Newton-meter-seconds is shown. True total momentum about the roll axis 180, true total momentum about the pitch axis 182, and true total momentum about the yaw axis 184 sum to yield the true total system momentum.

Referring now to FIGS. 7*a* through 7*d*, plots of simulated wheel speeds in RPM are shown. Wheel 1 speed 200 is essentially zero since wheel one is inoperative in this simulation. Wheel 2 speed 202, wheel 3 speed 204, and wheel 4 speed 206 each saturate, indicating that spacecraft 20 cannot maintain the commanded rotational rate. However, RW2 54, RW3 56, and RW4 58 come into and out of saturation in a periodic fashion, indicating that spacecraft 20 is under sustainable control.

Referring now to FIGS. 8*a* through 8*d*, various views of a polar plot indicating the body pitch axis trace in the ECI frame are shown. The initial body pitch axis points towards the sun along the ECI X axis, as indicated by 220. As spacecraft 20 executes the autonomous safing maneuver of the present invention, body pitch trace 222 forms a "FIG. 8" pattern. This permits both sufficient solar wing current and periodic T&C visibility to the ground. The "FIG. 8" pattern drifts due to the inability of spacecraft 20 to achieve commanded rates as indicated by wheel speed saturation as shown in FIGS. 7*b* through 7*d*.

While the best mode for carrying out the present invention has been described in detail, and several alternative embodiments have been presented, those familiar with the art to which this invention relates will recognize various alternative designs and embodiments within the scope and spirit of the present invention.

What is claimed is:

1. A method for autonomous safing of a spacecraft with reaction wheels, the spacecraft having at least one wing for generating power, the method comprising:

setting the at least one wing to continuous tracking;

determining a slew rate vector based on total angular momentum; and slewing the spacecraft using the slew rate vector until commanded to stop autonomous safing.

2. The method for autonomous safing of a spacecraft with reaction wheels as in claim 1, the spacecraft having four reaction wheels, the reaction wheel axes of rotation forming the slant edges of a pyramid having a square base, two reaction wheels on opposite edges of the pyramid forming a first pair and two reaction wheels remaining forming a second pair, the direction of the slew rate vector defining a slew axis of rotation, wherein determining a slew rate vector comprises:

determining as a selected pair the first pair if either reaction wheel in the second pair is inoperative, otherwise determining as the selected pair the second pair; and determining as the slew axis of rotation the normalized projection of the axes of rotation of the selected pair onto the base.

3. The method for autonomous safing of a spacecraft with reaction wheels as in claim 2, wherein determining a slew rate vector further comprises computing the product of a preset fault hold rate, the normalized projection of the axes of rotation of the selected pair, and the slew direction determined by the sign of the total angular momentum component along the slew axis of rotation.

4. A system for autonomous safing of a spacecraft having a body comprising:

at least one solar wing;

for each solar wing, a solar wing drive attaching the solar wing to the body, the solar wing drive operable to rotate the solar wing relative to the body;

a reaction wheel system within the body, the reaction wheel system operative to exchange rotational momentum with the body; and a control logic within the body, the control logic in communication with each solar wing drive and the reaction wheel system, the control logic operable to (a) set the at least one wing to continuous tracking, (b) determine a slew rate vector based on the total angular momentum, and (c) slew the spacecraft using the slew rate vector until commanded to stop autonomous safing.

5. The system for autonomous safing of a spacecraft as in claim 4, the reaction wheel system having four reaction wheels, the reaction wheel axes of rotation forming the slant edges of a pyramid having a square base, two reaction wheels on opposite edges of the pyramid forming a first pair and two reaction wheels remaining forming a second pair, the direction of the slew rate vector defining a slew axis of rotation, the control logic further operative to determine as a selected pair the first pair if either reaction wheel in the second pair is inoperative, otherwise determining as the selected pair the second pair, and determine as the slew axis of rotation the normalized projection of the axes of rotation of the selected pair onto the base.

6. The system for autonomous safing of a spacecraft as in claim 5, the spacecraft having a preset fault hold rate, the control logic further operative to determine the slew rate vector as the product of the preset fault hold rate, the normalized projection of the axes of rotation of the selected pair, and the slew direction determined by the sign of the total angular momentum component along the slew axis of rotation.

7. A method for autonomous safing of a spacecraft comprising the steps of:

providing a spacecraft comprising at least one wing for generating power and further comprising four reaction wheels, the four reaction wheels being respectively positioned along four slant edges of a pyramid having a square base;

orienting the spacecraft using at least two of the four reaction wheels operating simultaneously.

8. The method of claim 7, wherein the four reaction wheels include a first pair of oppositely disposed reaction wheels and a second pair of oppositely disposed reaction wheels, and wherein the step of orienting includes the step of operating a selected pair of reaction wheels as either the first pair of oppositely disposed reaction wheels or the second pair of oppositely disposed reaction wheels.

9. The method of claim 7, wherein the step of orienting includes the steps of setting the at least one wing to continuous tracking;

determining a slew rate vector based on total angular momentum; and slewing the spacecraft using the slew rate vector until commanded to stop.

10. The method of claim 9, wherein the step of determining includes the step of computing the product of a preset fault hold rate, the normalized projections of the axes of rotation of the selected pair, and the slew direction determined by the sign of the total angular momentum component along the slew axis of rotation.

* * * * *